Jan. 19, 1943.  C. SAURER  2,308,966
FRICTION DEVICE
Filed Jan. 21, 1941  5 Sheets-Sheet 1

INVENTOR
Curt Saurer
BY Ely & Frye
ATTORNEYS

Jan. 19, 1943.　　　C. SAURER　　　2,308,966
FRICTION DEVICE
Filed Jan. 21, 1941　　　5 Sheets-Sheet 2
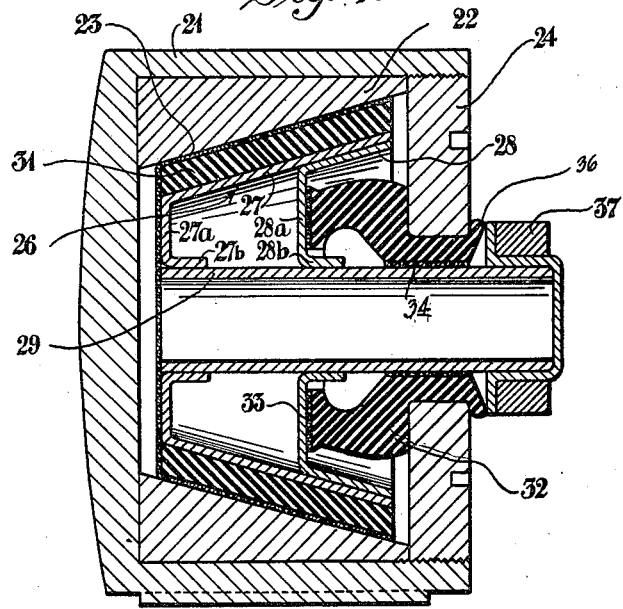
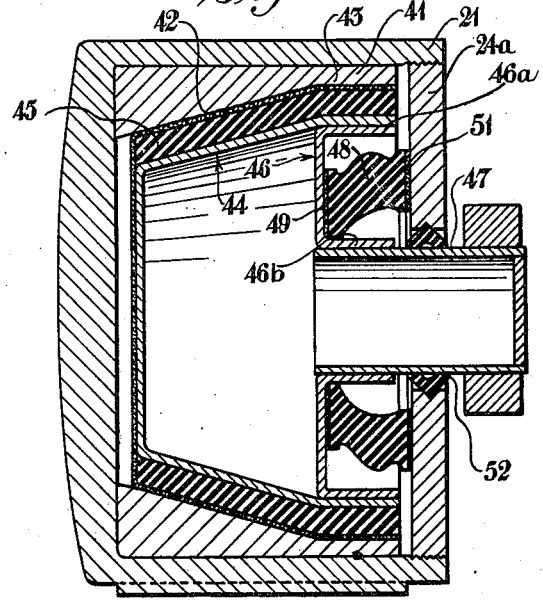
INVENTOR
Curt Saurer
BY
Ely & Frye
ATTORNEY

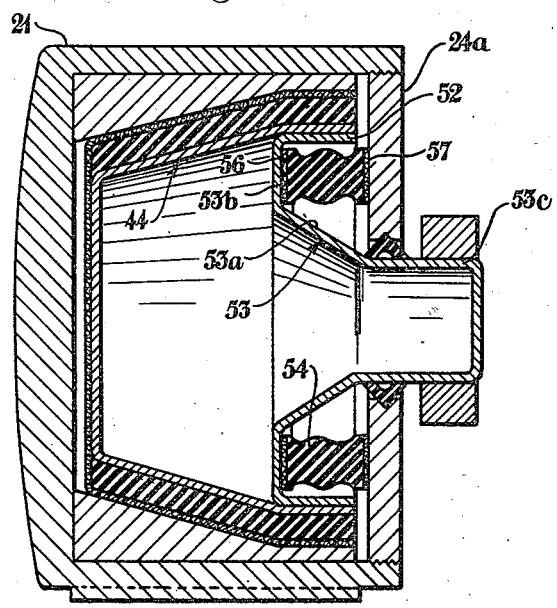
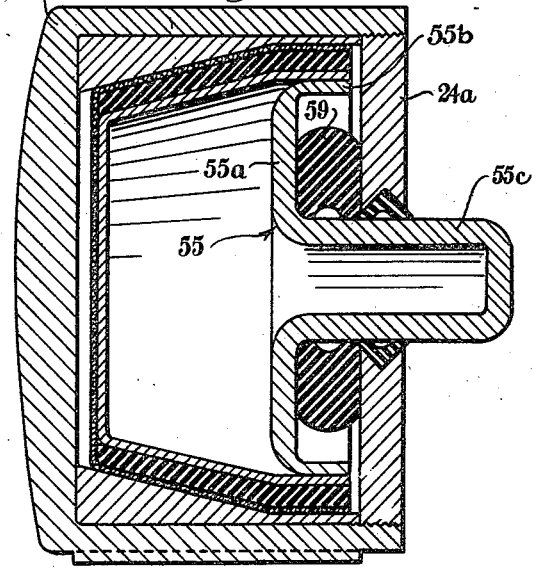

Jan. 19, 1943.   C. SAURER   2,308,966
FRICTION DEVICE
Filed Jan. 21, 1941   5 Sheets-Sheet 4

INVENTOR
Curt Saurer
BY
Ely r Frye
ATTORNEYS

Jan. 19, 1943.   C. SAURER   2,308,966
FRICTION DEVICE
Filed Jan. 21, 1941   5 Sheets-Sheet 5

INVENTOR
Curt Saurer
BY
ATTORNEYS

Patented Jan. 19, 1943

2,308,966

UNITED STATES PATENT OFFICE 2,308,966

FRICTION DEVICE

Curt Saurer, Akron, Ohio, assignor to The Firestone Tire & Rubber Company, Akron, Ohio, a corporation of Ohio Application January 21, 1941, Serial No. 375,229

6 Claims. (Cl. 188—130)

This invention relates to energy absorbing devices and more particularly to the type of device which is referred to as shock absorbers. The construction is such as to provide controllable frictional resistance between two relatively movable members.

The objects of the invention are to provide a device of the type referred to which will permit ready control of frictional resistance between relatively moving members; to provide a very simple construction which will be inexpensive to manufacture; to provide a frictional resisting device which will require substantially no attention during its normal useful operating life; to provide such a device having a minimum number of moving parts; to provide a shock absorbing device in which the friction surfaces will be so shaped as to eliminate the necessity for pivotal bearings which are subject to great wear; and to provide a construction in a friction device of the type mentioned which reduces the amount of finishing necessary on the friction parts.

Other objects will be readily apparent from the accompanying description, taken in connection with the accompanying drawings, in which:

Figure 3 is a vertical end section of Figure 2, on the line 3—3 looking in the direction of the arrows; and Figures 4 to 12 are vertical end sections of several further modified forms of the invention.

The present invention may comprise an outer stationary casing member having inner friction surfaces and an inner member arranged to be rotated with relation thereto in response to movements between relatively movable members.

Figure 1:
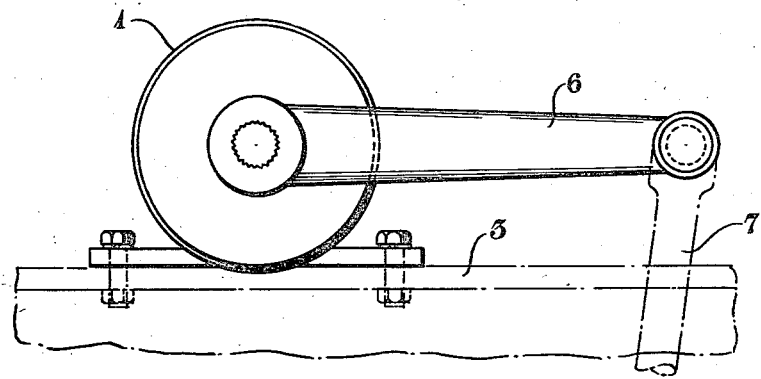
Figure 1 is a side elevation of an embodiment of the invention.
Figure 2:
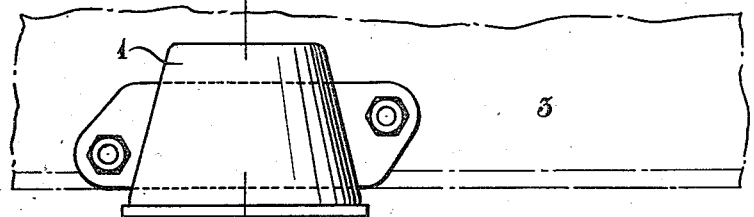
Figure 2 is a plan view of Figure 1.
Figures 3, 12:
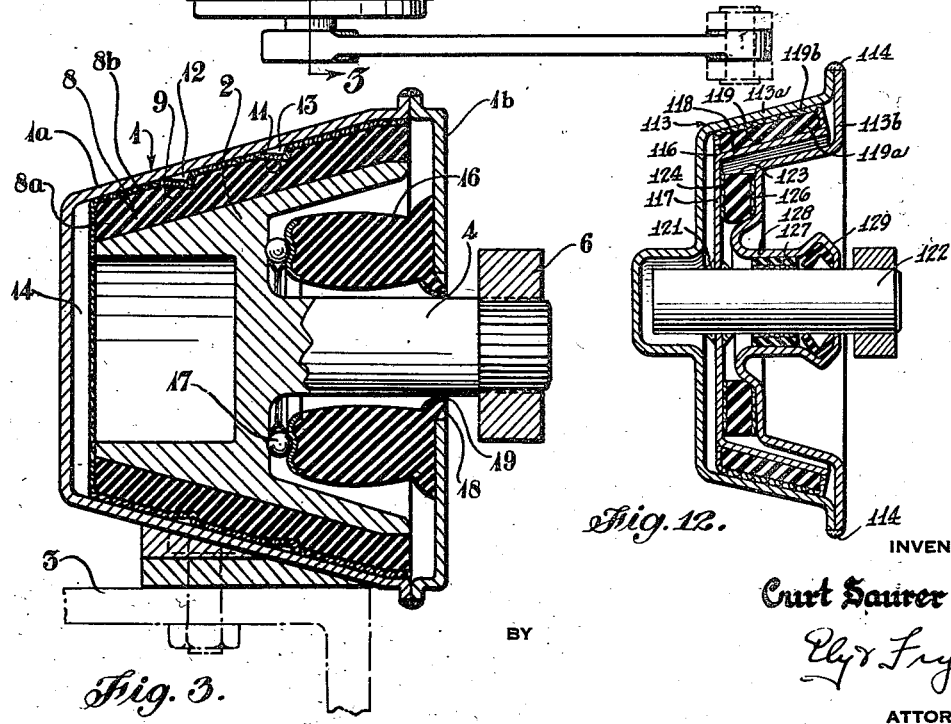

Referring specifically to Figures 1 to 3, inclusive, an embodiment of the invention chosen for the purposes of illustration, comprises an outer stationary casing 1 and an inner movable member 2. In the usual adaptation of the invention the casing is shown as suitably secured by means of bracket and bolts to a part of a vehicle, such as the frame 3. The inner member 2 is adapted to be rotated in the casing 1 and is carried on a stub shaft 4, which in turn carries an arm 6. The arm 6 is pivotally connected to a link 7 which in turn is pivotally connected to another part of the vehicle, such as the running gear (not shown). It will be readily apparent that relative movement between the parts of the vehicle, such as the running gear and frame, will cause the inner member to be rotated relatively of the outer casing 1 through means of the link 7 and the arm 6.

A novel feature of the present invention resides in the shape of the casing 1 and the inner member 2, whereby the necessity for finished metal-to-metal bearings is eliminated. The parts 1 and 2 can be made of metal stampings or forgings. The shape of the inner and outer members is such that the inner member will seek a position centrally of the outer casing. The casing 1 comprises a cup-shaped member 1a, the major portion of which is in the shape of a frustum of a cone, and a cover plate 1b which is attached to the open end of the member 1a. The inner member is substantially complemental in shape to the inner surface of the outer casing 1, but is somewhat smaller in dimension. A friction bushing 8, is interposed between the outer casing 1 and the inner member and is fixed to rotate with the inner member 2. This friction bushing comprises a rubber sleeve 8a which is chemically bonded to the member 2 and an outer friction sleeve 8b which is integrally bonded to the rubber sleeve 8a. The friction sleeve is made of a suitable textile fibrous material which functions in the manner of a wick and this material is impregnated with a suitable lubricant. Preferably this lubricant is graphite suspended in a liquid vehicle such as castor oil, or any other oil not injurious to the rubber or any suitable plastic which may be used to replace the rubber. The inner member 2 has circumferential recesses 9 and 11 into which the friction sleeve 8b is depressed to form circumferential voids 12 and 13, which retain excess lubricant. A friction device of this kind has a greater dynamic coefficient of friction than static coefficient. Therefore, there is no "breakaway," since it takes a smaller force to initiate the movement than it does to maintain the movement. This friction material also has the peculiar characteristic that the dynamic coefficient increases with the relative speed of movement between the friction surfaces.

The resiliency of the rubber sleeve 8a and that of the friction sleeve 8b permits the latter to adjust itself to any slight irregularities or eccentricity in the metal members so that metal stampings or forgings can be used. Also tool marks on such metal parts do not have to be removed by expensive machining operations. The friction surfaces, themselves, serve as the bearing for the inner member, thus eliminating finished metal bearings.

If desired, friction bushing 8 may be cup-shaped as specifically shown in Figure 3 and the space 14 between the friction material and the closed end of the cup-shaped member 1a may contain excess lubricant which will feed by wick action onto the friction surfaces surrounding the axis of the inner member 2.

An annular resilient ring 16, disposed between the end plate 1a and the inner member 2 resiliently urges the latter to the left in Figure 3 through the agency of a ball thrust bearing assembly 17. The annular ring 16 is provided with an inner lip 18 on the righthand side of Figure 3. This lip is provided with a friction gasket 19 which is preferably of the same material as that of the friction sleeve 8b. This sleeve helps seal the device against the entrance of water, dirt, and other foreign matter, and, at the same time, serves as a lubricant and prevents chafing of the rubber lip 18.

In the construction shown in Figures 1 and 3, the inner member 2 is shown in the form of a forging and is integral with the stub shaft 4, but it will be readily apparent that, if desired, this member can be detachably secured to the stub shaft.

In Figure 4, a modified form of the invention is shown in which the fundamental operation is the same as that of the construction of Figures 1 to 3, but the inner and outer members are constructed somewhat differently. This modification comprises an outer cup-shaped casing 21, which may be secured to the frame of the vehicle, described in connection with Figures 1 to 3. An inside metal sleeve 22 has an inner conical surface 23. A screw-threaded end plate 24 threadedly engages the open end of the casing 21.

An inner member 26, corresponding to the inner member 2 of Figure 3, is made of metal stampings 27 and 28, which are secured or press fit to a hollow stub shaft 29. These two metal stampings are in the shape of frustums of cones and are arranged in nested relation, the stamping 28 being arranged in the open end of stamping 27. The stampings 27 and 28 have respective disc flanges 27a and 28a. These disc flanges have, respectively, inturned axial flanges 27b and 28b, the latter being secured on a hollow stub shaft 29 by a press fit, or by welding. It is to be understood that, if desired, the telescoping portions of the stampings 27 and 28 may be welded together in any suitable manner to form a unitary structure.

The inner member 26 has an outer friction bushing 31 which is identical with that described in connection with Figures 1 to 3, inclusive. The rubber part of the friction sleeve is vulcanized to the outer surface of the metal stamping 27. The pressure between the friction bushing 31 and the inner conical surface 23 of the metal sleeve 22 is regulated by an annular resilient bushing 32 which is interposed between the end plate 24 and the disc flange 28a. The lefthand end of the bushing 32 is provided with a friction disc 33 which is of exactly the same nature as the friction sleeve 8b described in connection with Figures 1 to 3. This disc 33 serves as a friction surface and, at the same time, serves as a lubricated bearing. The rubber bushing 32 is also provided with a cylindrical friction sleeve 34 where the bushing contacts the stub shaft 29. This friction sleeve serves a dual purpose as a dirt seal and also as a bearing. If desired, the bushing 32 may be provided with an outer integral flange 36 which abuts against an arm 37 on the end of the stub shaft 29 to form an additional dirt seal. It will be readily apparent that by adjusting the position of the end plate relatively of the casing 21 the frictional resistance of the device may be readily controlled. The axial extent of the sleeve 22 is such as to limit the pressure that can be applied to the friction surfaces through the resilient bushing 32.

Figure 5 is a further modification of the present invention. Outer casing 21 has a modified inner sleeve 41 having an inner friction surface including a conical section 42 and a cylindrical section 43. The inner member, corresponding to member 2 of Figure 3, comprises a metal stamping 44 which is complemental in shape to the inner surface of the sleeve 41. This metal stamping 44 is cup-shaped and has one open end and one closed end. The open end is arranged in nested relation to an annular metal stamping 46 having a U-shaped cross section which thereby provides outer and inner axial flanges 46a and 46b, respectively. The outer axial flange 46a is secured to the metal stamping 44 by a press fit or by welding, as desired. The inner axial flange is press fit or welded onto a hollow stub shaft 47. A friction sleeve 45, similar to the friction sleeve 8 of Figure 3, is chemically bonded to the outer surface of the metal stamping 44. The pressure between the friction surfaces on the inner member and the sleeve 41 is controlled by an annular resilient bushing 48 which is interposed between the inner surface of a plate 24a and the disc portion of the stamping 46. The plate 24a is screw threaded into the open end of the casing 21 to adjustably exert pressure on the friction surfaces. Friction discs 49 and 51 of the same material as the friction sleeve 8b of Figure 3 are integrally attached to the opposite ends of the resilient bushing 48 to provide lubricated surfaces. A suitable rubber gasket 52 of suitable construction is arranged around the stub shaft 47 and in an aperture in the plate 24a. The operation of this device is substantially identical with that of the figures previous described.

The construction of Figure 6 varies from that of Figure 5 only in the matter of the stub shaft construction which controls the movement of the inner member. In Figure 6 the cylindrical portion of the metal stamping 44 is arranged in press fit relation with a cylindrical portion 52 on a spider 53. This spider 53 comprises a frustoconical section 53a, an integral disc portion 53b on which the cylindrical portion 52 is supported, and a hollow stub shaft portion 53c. A resilient sleeve 54 is provided at its opposite ends with friction discs 56 and 57, similar to the friction disc 49 and 51, respectively, of Figure 5. By adjusting the position of the plate 24a with respect to the outer casing 21, the pressure on the friction surfaces may be readily controlled as previously described. The operation of this figure is similar to that of the other forms of the invention previously described.

Figure 7 shows a further modified form of the invention which is substantially identical with that shown in Figure 6, with the exception that the inner member is carried on a different spider member 55. This spider has a disc portion 55a, a peripheral flange 55b, and a hollow tubular axial extension 55c which serves as a stub shaft. This stub shaft may carry an arm similar to the arm 6 described in connection with Figures 1 to 3. A resilient annular bushing 59 between plate 24a and the disc portion 55a resiliently urges the inner member to the left, as shown in the figure, and the pressure on these surfaces can be controlled by adjusting the position of the plate 24a with respect to the outer casing 21.

Figure 8:
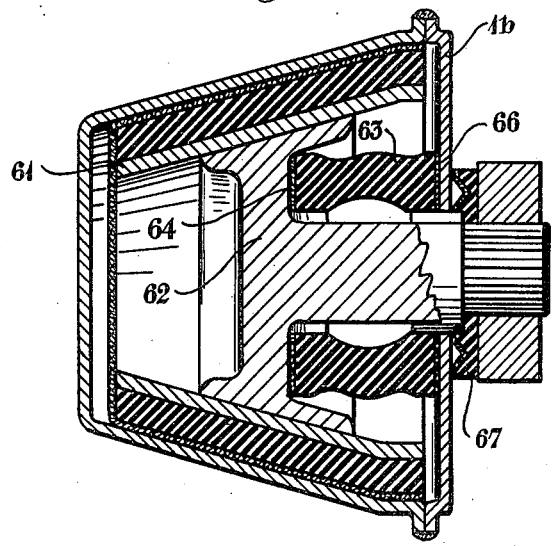

Figure 8 is similar to the construction of Figures 1 to 3, except that the inner member is made of a metal stamping 61 of frusto-conical shape, welded or otherwise fixedly secured on a forged spider 62. A resilient sleeve 63 urges the spider to the left in the figure to apply pressure to the friction surfaces. The sleeve 63 has friction discs 64 and 66 which respectively contact the spider 62 and the outer plate 1b. A suitable dirt seal 67 comprising a rubber ring having one flat side, which is adapted to contact the arm on the end of the stub shaft, and the other side having a V-shaped groove provided with friction material of the type previously described and contacting the outer surface of the plate 1b provides an effective seal against the entrance of dirt and water to the inside of the casing.

Figure 9:
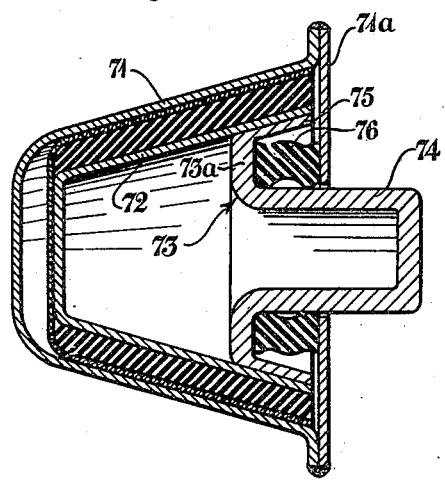

The modification shown in Figure 9 is practically the same as that shown in Figure 8, except that the outer case 71 is generally frusto-conical, and of the specific shape shown in the figure. The inner member comprises a frusto-conical cup 72 telescoped on a spider 73 having an integral hollow stub shaft 74. The spider has a disc portion 73a and an integral frusto-conical flange 75 which is in nested relation with the frusto-conical cup 72 and may be secured to the latter by welding. In a manner similar to that previously described, a resilient bushing 76 is arranged between the end plate 71a of the casing 71 and the disc portion 73a of the spider 73. This resilient bushing 76 urges the inner member to the left and maintains the pressure between the friction surfaces.

Figure 10:
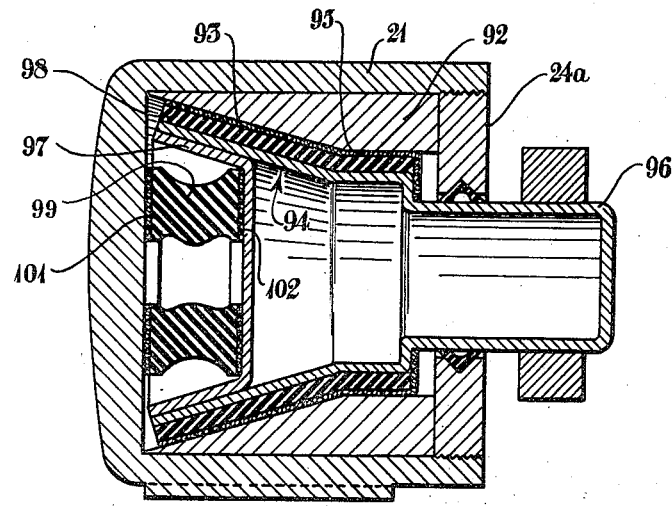

A further modified form of the invention is shown in Figure 10, in which the outer casing is substantially identical with that shown in Figures 4 to 7, inclusive. An inner sleeve 92, having a frusto-conical inner surface 93 and a cylindrical surface 95, is arranged inside of the outer casing. An inner spider member 94, formed of a hollow stamping, has an integral stub shaft 96. The spider has frusto-conical and cylindrical surfaces which are complemental to the inner surfaces of the sleeve 92, but are of slightly smaller dimensions, in order to enable the interposition of a friction bushing 98 of the type described in connection with the other figures. A frusto-conical cup 97 is disposed in the open end of the spider in nested relation thereto and is secured thereto by welding, as desired. The friction bushing 98, similar to the friction bushing 8 of Figure 3, is integrally bonded to the outer surface of the spider 94. A resilient bushing 99 is disposed between the end of the casing 21 and the end of the cup 97 to resiliently maintain the pressure on the friction surfaces. Friction discs 101 and 102 on the opposite ends of this resilient bushing 99 provide lubricated surfaces for relative movement between the frusto-conical cup 97 and the casing 21. The pressure on the friction surfaces may be regulated by adjustment of the end plate 24a with relation to the casing 21.

The left hand end of the sleeve 92 may be cut or ground off to make it possible to force the sleeve 92 farther to the left to increase the pressure on the friction surfaces.

Figure 11:
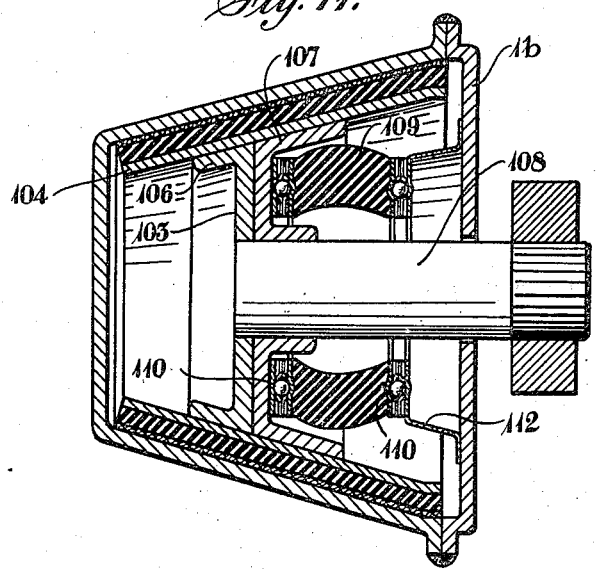

Figure 11 is substantially identical with the construction shown in Figure 8, the only difference being in the construction of the inner member. In Figure 11 the inner member comprises a spider 103, which carries outer frusto-conical elements 106 and 107 which are press fit onto a stub shaft 108 and arranged to form the frustum of a cone, which is nested inside of the sleeve 104. The resilient bushing 109 maintains the pressure on the friction surfaces in the usual manner through the agency of thrust ball bearing assemblies 110 and an annular spacer 112 secured to the end plate 1b of the casing.

A further modified form of the invention is shown in Figure 12, having an outer casing 113 comprising two metal stampings 113a and 113b. These stampings are assembled to form an inclosed casing and are welded at 114 throughout their abutting peripheries. The outer casing may be fixed to the frame of the vehicle as described in connection with the construction of Figures 1 to 3. The inner member 116, which carries the special friction sleeve, is adapted to be oscillated with relation to the outer casing in a manner similar to that described in connection with the construction of Figure 3. This inner member 116 is made up of a disc portion 117 and a frusto-conical flange 118 having substantially the same shape as the frusto-conical section of the stamping 113a. A friction bushing 119, similar to the friction bushing 8 of Figure 3, is chemically bonded to the frusto-conical flange 118. This friction bushing 119 comprises a rubber sleeve 119a which is chemically bonded to the flange 118 and an outer layer of friction material 119b, similar to the material of the sleeve 8b of Figure 3. The friction material 119b is integrally vulcanized to the rubber sleeve 119a and extends over the ends of the rubber sleeve 119. The disc 117 of the inner member 116 is welded at 121 to stub shaft 122. The pressure on the friction surfaces is controlled by a resilient annular bushing 123 having friction discs 124 and 126 on its lateral faces. A tubular bushing 127, having a layer of lubricated friction material on its inner surface, is mounted upon the shaft 122 between the latter and a hub extension 128 on the stamping 113b and serves to prevent entry of foreign matter, while at the same time preventing the escape of lubricant from the friction device. An annular gasket 129 of inverted V-shaped cross section, between the outer end of the hub 128 and the shaft provides an additional seal to prevent the entrance of water and dirt into the casing of the friction device. It will be readily understood that by means of an arm and link mechanism, as described in connection with Figures 1 to 3, the inner member 116 will oscillate with respect to the outer casing 113 in response to relative movements between the running gear and frame of a vehicle.

In the specification and claims where reference is made to the resilient or rubber bushing, it is to be understood that it is contemplated that any suitable substitution for rubber or any materials having the resilient characteristics and other characteristics which adapt it to substitution of the construction shown, is intended to be included. It will also be understood that the operation of all of the modified forms will be, in general, similar to that described in connection with figures 1 to 3 and therefore repetition of the specific adaptation of each modified form has not been shown.

While I have herein shown and particularly described some embodiments of my invention, I do not wish it to be understood that I intend to limit the invention to the precise construction herein shown and particularly described, and it will be readily apparent to those skilled in the art that many modifications may be made without departing from the spirit of the invention.

What is claimed is:

1. A friction device having an outer casing member of frusto-conical section, an inner rigid member having a complemental shape, a friction sleeve fixed to one of said members, said friction sleeve comprising a resilient layer attached to said inner member and a layer of fibrous material secured to said resilient layer, said fibrous material being impregnated with a lubricant, and means for oscillating said inner member relatively of said outer member.

2. A friction device having an outer casing that has an inner frusto-conical surface, an inner member having a complemental outer surface confronting the latter, a friction sleeve fixed to one of said frusto-conical surfaces, resilient means constantly urging said casing and inner member axially toward each other into nested frictional engagement with said sleeve whereby said friction surfaces serve as the sole bearing and guide means between said inner member and said outer casing, said resilient means being formed with means constituting a seal between the outer casing and inner member, and means for causing relative rotation between said outer casing and said inner member.

3. A friction device comprising an outer casing member having an inner friction surface made up of a cylindrical portion and a frusto-conical portion, an inner member having a substantially complemental outer surface, a friction sleeve fixed to the cylindrical and frusto-conical surfaces of one of said members, yielding means urging the conical portions of said friction surfaces into nested frictional engagement whereby said friction surfaces serve as the sole bearing and guide surfaces between said inner and outer members, and means for causing relative rotation between said inner and outer members.

4. A friction device comprising an outer casing having an inner frusto-conical friction surface, an inner member having a friction sleeve fixed to its outer surface, said inner member comprising a plurality of cup-shaped members, each having a disc portion and a peripheral flange, said peripheral flanges contacting in nested relation and said disc portions being in spaced relation, at least one of said disc portions being secured to a shaft.

5. A friction device comprising an outer casing comprising a pair of nested metal stampings, each metal stamping having a central disc portion and a frusto-conical portion circumscribing the same, one of said stampings having an integral peripheral disc portion, which latter portion is associated with the other of said stampings to form a closed casing, an inner member comprising a metal stamping having a disc portion and a peripheral frusto-conical portion, a friction sleeve attached to the outer surface of the frusto-conical portion of said inner member, resilient means between the disc portion of said inner member and the disc portion of one of said outer stamping members to resiliently urge the frusto-conical portions of said inner and outer members toward each other, and a shaft secured to said inner member.

6. A friction device comprising an outer casing having an inner frusto-conical friction surface, an inner member concentric therewith and formed exteriorly with a frusto-conical face on which a sleeve or friction material is mounted, said inner member comprising a pair of laterally spaced apart, axially apertured discs, flanges formed on the respective discs about the apertures therein, and a shaft extending through the disc apertures and secured to said flanges.

CURT SAURER.